United States Patent
Negulescu et al.

(10) Patent No.: US 6,260,352 B1
(45) Date of Patent: Jul. 17, 2001

(54) TURBOFAN AIRCRAFT ENGINE

(75) Inventors: Dimitrie Negulescu, Berlin; Jörg Haarmeyer, Rangsdorf, both of (DE)

(73) Assignee: Rolls-Royce Deutschland Ltd & Co KG, Oberursel (DE)

( * ) Notice: Subject to any disclaimer, the term of this patent is extended or adjusted under 35 U.S.C. 154(b) by 0 days.

(21) Appl. No.: 09/297,974

(22) PCT Filed: Aug. 21, 1998

(86) PCT No.: PCT/EP98/05326

§ 371 Date: Jul. 14, 1999

§ 102(e) Date: Jul. 14, 1999

(87) PCT Pub. No.: WO99/14464

PCT Pub. Date: Mar. 25, 1999

(30) Foreign Application Priority Data

Sep. 12, 1997 (DE) .............................. 197 40 228

(51) Int. Cl.⁷ ..................................................... F02K 1/38
(52) U.S. Cl. .................................................. 60/262
(58) Field of Search ................... 60/226.1, 262, 60/266

(56) References Cited

U.S. PATENT DOCUMENTS

| | | |
|---|---|---|
| 2,789,416 | 4/1957 | Mirza . |
| 4,175,640 | 11/1979 | Birch et al. . |
| 4,214,441 * | 7/1980 | Mouritsen et al. ............... 239/127.3 |
| 5,184,459 * | 2/1993 | McAndrews ...................... 60/226.3 |
| 5,216,879 | 6/1993 | Zysmaan . |

FOREIGN PATENT DOCUMENTS

| | | |
|---|---|---|
| 3210199 | 11/1982 | (DE) . |
| 3940423 | 6/1990 | (DE) . |
| 3324347 | 4/1993 | (DE) . |
| 19524731 | 1/1997 | (DE) . |
| 0514119 | 11/1992 | (EP) . |
| 623615 | 5/1949 | (GB) . |
| 695482 | 8/1953 | (GB) . |
| 814380 | 6/1959 | (GB) . |
| 2149022 | 6/1985 | (GB) . |

* cited by examiner

Primary Examiner—Timothy S. Thorpe
Assistant Examiner—W. Rodriguez
(74) Attorney, Agent, or Firm—Crowell & Moring LLP

(57) ABSTRACT

A turbofan aircraft engine has a core engine, which is arranged in a gondola, and a fan which delivers a cold air current through a bypass flow duct to a mixer within which a low-pressure turbine cone is provided and on which the hot-gas current emerging from the low-pressure turbine of the core engine is mixed with the cold-air current. A portion of the cold-air current is branched off by an ejector effect and, as a cooling air current for the low pressure turbine housing, arrives in a ring gap between the housing and a covering surrounding this housing. A portion of this cooling air current is guided by hollow outlet guide blades of a follower guide wheel of the low-pressure turbine for sealing off the rearmost ring gap between the rotor and the stator of the low-pressure turbine, while the largest portion of the cooling air current reaches the ejector. The largest portion of the cooling air current arrives through the hollow outlet guide blades in the interior of the low-pressure turbine cone which has a jet-type outlet opening at its downstream free end section. As a result, this downstream end section acts as an ejector by way of which the cooling air current is admixed to the air current coming from the mixer.

8 Claims, 3 Drawing Sheets

PRIOR ART ents of the low-pressure turbine 3.

TURBOFAN AIRCRAFT ENGINE

BACKGROUND AND SUMMARY OF THE INVENTION

The present invention relates to a turbofan aircraft engine having a core engine, which is arranged in a gondola, and a fan which delivers a cold air current through a bypass flow duct to a mixer within which a low-pressure turbine cone is provided and on which the hot-gas current emerging from the low-pressure turbine of the core engine is mixed with the cold-air current. A portion of the cold-air current is branched off by an ejector effect and arrives, as a cooling air current for the low pressure turbine housing, in a ring gap between the housing and a covering surrounding this housing. A portion of this cooling air current is guided by hollow outlet guide blades of a follower guide wheel of the low-pressure turbine for sealing off the rearmost ring gap between the rotor and the stator of the low-pressure turbine, while the largest portion of the cooling air current reaches the ejector.

Reference is made to German Patent Document DE 33 24 347 C2 as well as to the applicant's BR 710 engine for examples of the technical environment.

A sufficient cooling of the low-pressure turbine housing can basically be achieved by certain characteristics. The state of the art known from the BR 710 aircraft engine is illustrated in FIG. 3 and will now be explained briefly. With respect to the overall arrangement in the aircraft engine, reference is partially made in this case also to FIG. 1 which otherwise, however, shows the design according to the invention. FIG. 1 is a partial longitudinal sectional view of a turbofan aircraft engine.

In FIG. 1, reference number 1 indicates the gondola of a turbofan aircraft engine, inside of which the so-called core engine 2 is concentrically arranged. In the downstream end area of the core engine 2, as is customary, the low-pressure turbine 3 is situated and is adjoined by a low-pressure turbine cone 4, while the fan 5 is provided upstream of the core engine 2. This fan 5 is driven by the turbine shaft of the aircraft engine, which is not shown in detail, and delivers a cold-air current 6 through a bypass flow duct 7 situated between the gondola 1 and the core engine 2.

Between the low-pressure turbine cone 4 and the interior wall of the gondola 1, a ring-shaped mixer 8 is concentrically provided. This ring-shaped mixer may be constructed, for example, as a blossom-type mixer. The hot-gas current 9 coming out of the low-pressure turbine 3 is mixed on or in this mixer with the cold-air current 6.

The low-pressure turbine housing is marked with reference number 10 in FIG. 1. This low-pressure housing 10 is surrounded by a covering 11 of the low-pressure turbine 3, and a ring gap 12 is situated between the covering 11 and the low-pressure turbine housing 10.

A cooling air current 13 is guided through this ring gap 12. This cooling air current is branched off the cold-air current 6 and is used particularly for cooling the low-pressure turbine housing 10.

As illustrated in the known construction shown in FIG. 3, this cooling air current 13 is delivered, that is, branched off the cold air current 6 by an ejector effect. In the known construction, the downstream end area 11a of the covering 11 is constructed in the manner of a jet for this purpose; that is, in this end area 11a, the covering 11 together with the mixer inlet 8a forms a jet ring gap acting as an ejector 14. By means of this ejector 14, the cooling air current 13 is therefore entrained by the cold air current 6 flowing between the interior wall 1a of the gondola and the mixer 8.

In order to prevent a so-called hot-gas entry (this term describes the occurrence of hot gas from the turbine annulus reaching the turbine shaft from the blades), in the known art, a fraction of the cooling air current 13 is guided through the hollow outlet guide blades 15 of the low-pressure turbine follower guide wheel of the core engine 2, as a whole marked with reference number 16, for sealing off the rearmost ring gap 17 between the rotor 18 and the stator 19 of the low-pressure turbine 3. The corresponding flow of a fraction of the cooling air current 13 is indicated by the arrow 20.

Based on 100% cooling air, which enters the ring gap 12 as the cooling air current 13, for example, 5% reaches the ring gap 17 in the direction indicated by the arrow 20, while the remaining 95% of the cooling air is removed by the ejector 14 in the direction indicated by the arrow 21 in the known construction.

This solution for cooling the low-pressure turbine housing 10 is basically acceptable, but when the cooling air current according to arrow 21 is reintroduced into the bypass flow duct 7, flow losses occur and the specific engine consumption can be increased. In addition, for certain applications, it may be desirable to achieve an even stronger cooling of components of the low-pressure turbine 3.

It is therefore an object of the present invention to provide guiding of the cooling air current on a turbofan aircraft engine which is improved with respect to the known prior art.

This object is achieved by having the largest portion of the cooling air current arrive through the hollow outlet guide blades in the interior of the low-pressure turbine cone which has a jet-type outlet opening at its downstream free end section so that this downstream end section acts as an ejector by which the cooling air current is admixed to the air current coming from the mixer. Advantageous further developments are also claimed.

BRIEF DESCRIPTION OF THE DRAWINGS

The invention will now be further explained with reference to a preferred embodiment.

DESCRIPTION OF THE PREFERRED EMBODIMENT

In the following description, the same reference numbers are used to indicate certain components or air currents of the invention which have already been explained in connection with the prior art.

Figure 1:
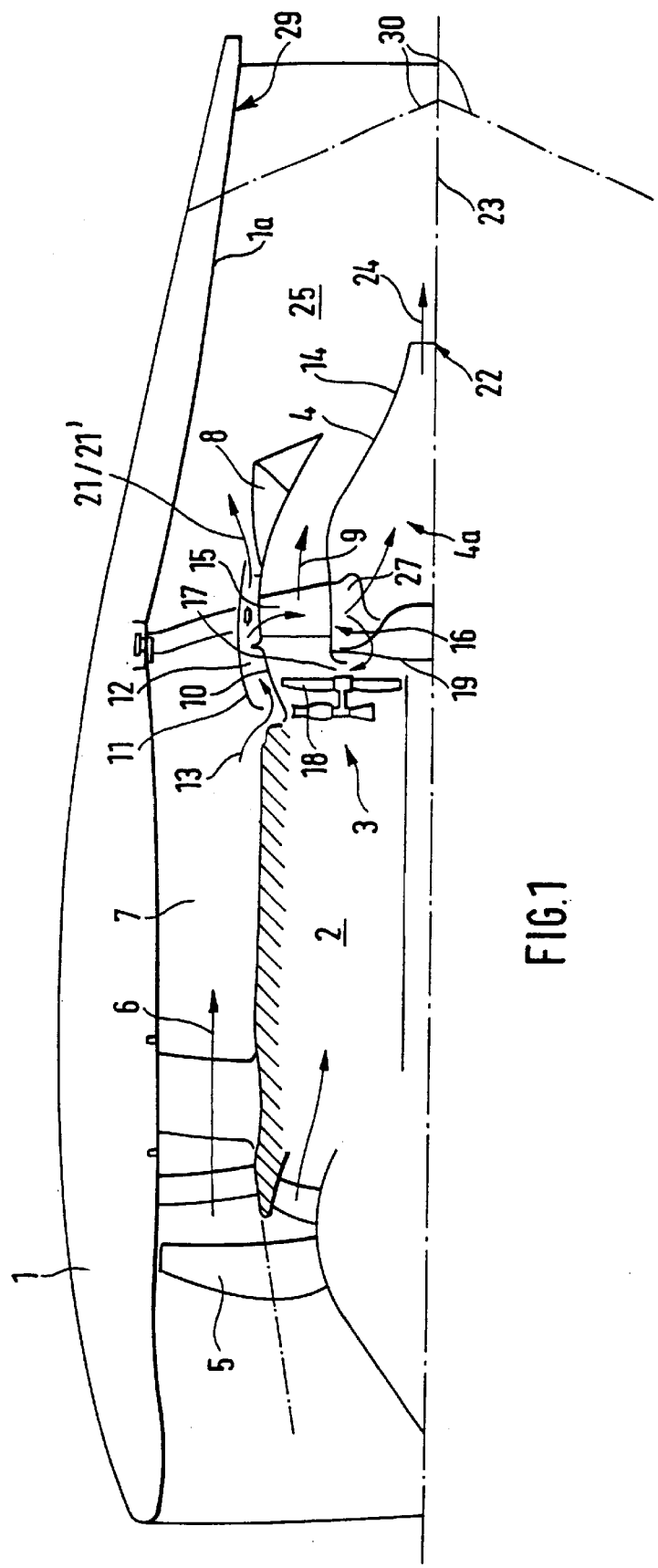
FIG. 1 is an extremely simplified longitudinal semisectional view of a turbofan aircraft engine according to the invention.
Figure 2:
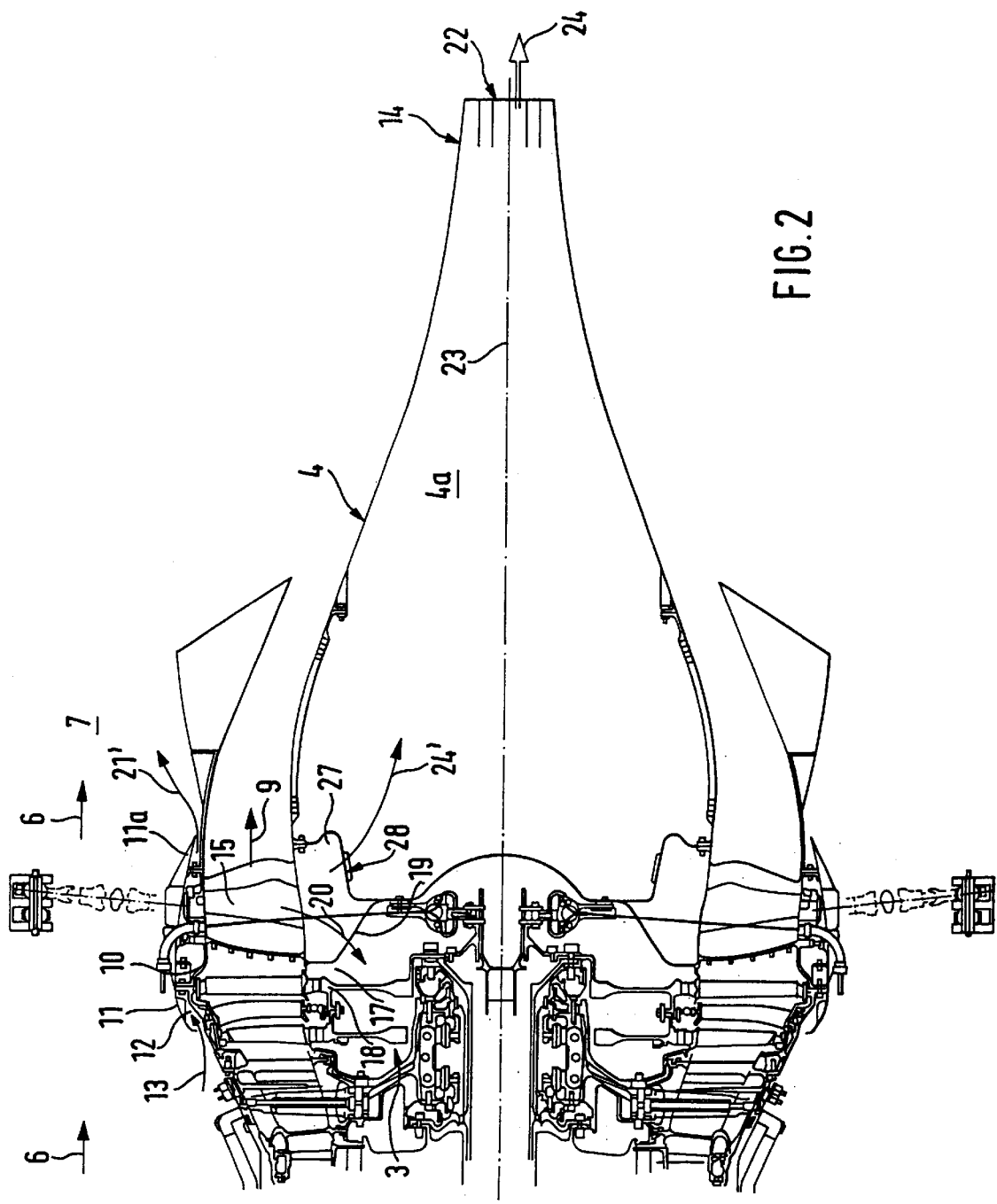
FIG. 2 is a sectional view of the downstream end of the low-pressure turbine with the adjoining low-pressure turbine cone designed according to the invention.
Figure 3:
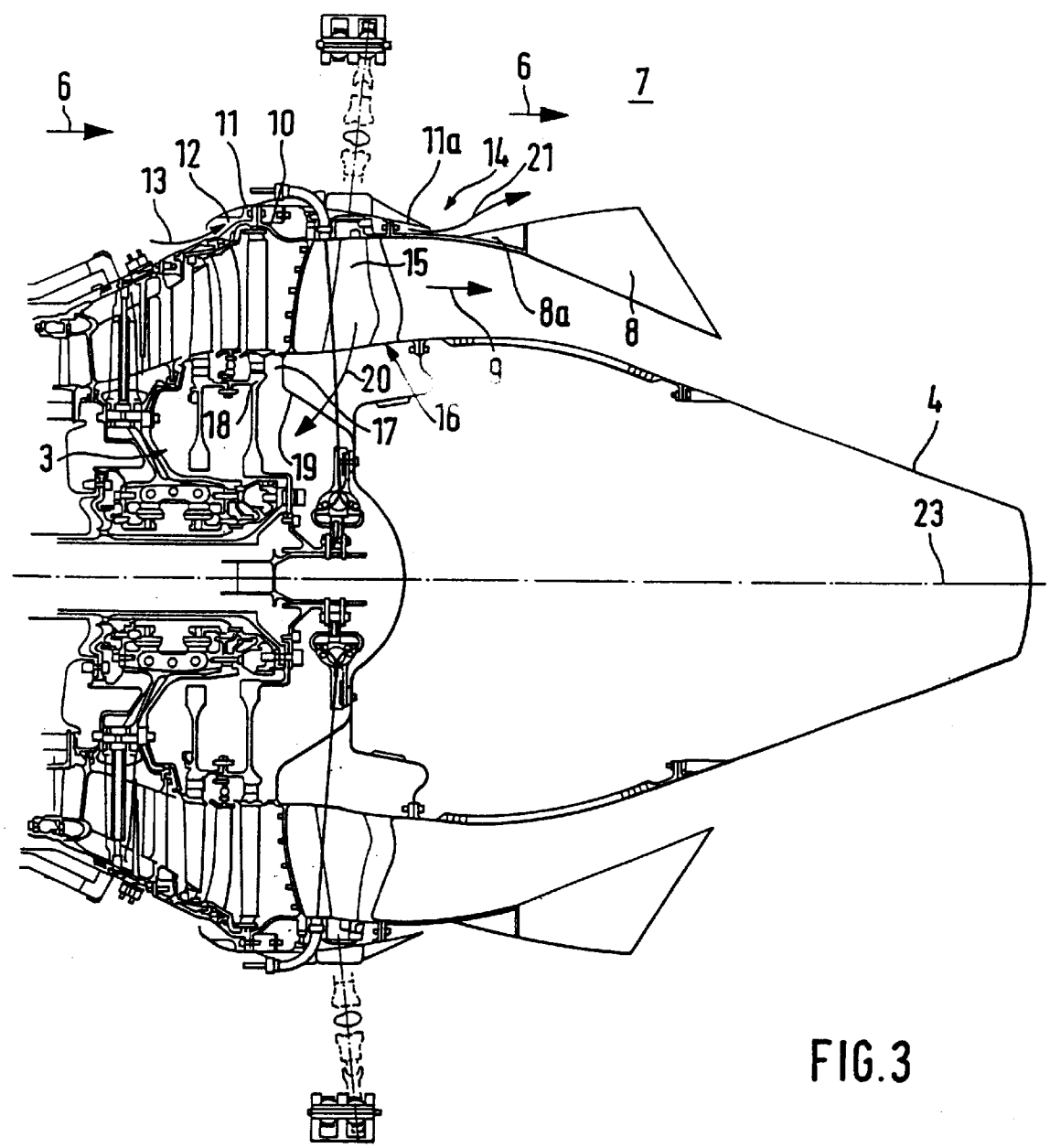
FIG. 3, as mentioned above, is a representation of the known prior art.

A comparison of FIGS. 2 and 3 shows that the low-pressure turbine cone 4 according to the invention has a jet-type outlet opening 22 at its downstream free end section, which outlet opening 22 is illustrated here slightly perspectively. By way of this outlet opening, which is centrally situated with respect to the central longitudinal axis 23 of the aircraft engine, according to the direction of the arrow 24, an air current can be withdrawn from the interior 4a of the low-pressure turbine cone 4 which has the conventional hollow construction. This is because the downstream free end section of the low-pressure turbine cone 4, together with the air current guided in the annulus between its surface and the interior wall 1a of the gondola, forms an ejector. This is also illustrated in FIG. 1, in which the above-mentioned annulus between the surface of the low-pressure turbine cone 4 and the interior wall 1a of the gondola is indicated by the reference number 25. The hot-gas current 9, which was previously mixed with the cold-air current 6 in the mixer 8, flows through this annulus 25 in the direction of the central longitudinal axis as well as in the direction of the arrow 24.

In order to design an optimal ejector 14 with the low-pressure turbine cone 4, the downstream free end section of the low-pressure turbine cone 4 is naturally geometrically suitably shaped and particularly also deviates from the known prior art according to FIG. 3.

According to the invention, the largest portion of the cooling air current 13 now arrives in the interior 4a of the low-pressure turbine cone 4 so that the ejector 14 provided at the downstream end section of the low-pressure cone 4 delivers this cooling air current 13 as desired and such that it branches off the cold air current 6.

According to the design shown in FIG. 2, the same geometrical conditions as in the known prior art according to FIG. 3 therefore exist in the inlet section of the ring gap 12 between the low-pressure turbine housing 10 and the covering 11. In particular, 100% of the cooling air current 13 branched off the cold air current 6 arrives in the ring gap 12 and is therefore guided along the exterior side of the low-pressure turbine housing 10, whereby this housing can be optimally cooled.

In contrast to the prior art, the ring gap 12 in the downstream end area 11a of the covering 11 (that is, the ejector which, in the prior art construction shown in FIG. 3, has the reference number 14) can now be at least partially sealed off as is the case in the construction shown in FIG. 2. As a result, only a fraction of the cooling air current 13 according to the arrow 21' exits again into the bypass flow duct 7. The largest portion of the cooling air current 13, on the other hand, is now guided through the hollow outlet guide blade 15 into a ring-shaped hollow space 27 which is situated below the hollow outlet guide blade under the effect of the ejector 14. In this ring-shaped hollow space 27, the cooling air current emerging from the hollow space of the outlet guide blade 15, which is not shown and not indicated in detail, is divided, specifically according to the arrow 20, into a fraction which, analogously to the known prior art, arrives at the ring gap 17 as well as into a significantly larger portion which, according to the arrow 24', arrives in the interior 4a of the low-pressure turbine cone 4. The amount of the air current 24' is the same as that of the air current 24 delivered by the ejector 14.

The design of the individual passage openings, gaps and the like, which influence the cooling air current 13 as well as the air flows according to the arrows 20, 21', 24' and 24, may in this case be provided such that of the cooling air current 13, 5% is again guided according to arrow 20 to the annulus 27, while 90% exits according to the arrows 24' and 25 through the ejector 14 which, as mentioned above, is the actual driving force for this cooling air flow 13. The remaining 5% exits according to the arrow 21' by way of the end section of the ring gap 12 in the downstream end area 11a of the covering 11 into the bypass flow duct 7.

The guiding of the cooling air described here, in the case of which the ejector 14 is provided on the downstream free end section of the low-pressure turbine cone, therefore has the advantage that a larger amount of cooling air flows through the outlet guide blade 15 which results in an improved cooling of the low-pressure turbine components. In addition, flow losses in the bypass flow duct 7 are avoided which, in the known prior art, are caused by the ejector provided there.

As mentioned above, the ring gap 12 is at least partially sealed off between the low-pressure turbine housing 10 and the covering 11 surrounding it, on its downstream end, that is, in the end area 11a of the covering 11. As a result, the air current, which is significantly reduced in comparison to the air current 21 according to FIG. 3, can flow out according to arrow 21' by way of the end section of the ring gap 12 into the bypass flow duct 7. As mentioned above, the sealing of the downstream end of the ring gap 12 in this case is situated in the area of the mixer inlet 8a.

In order to enable the cooling air flow, which arrives in the ring-shaped hollow space 27 through the hollow outlet guide blade 15, to enter into the interior 4a of the low-pressure turbine cone 4, this low-pressure turbine cone 4 has in its upstream end section, that is, in the area of this ring-shaped hollow space 27, on the circumference side, several air transfer openings 28 which, like the whole cooling air flow passage, are optimized under fluidic aspects from the inflow from the bypass flow duct 7 through the hollow outlet guide blades 15 to the jet-type outlet opening 22.

Likewise, the downstream end section of the low-pressure turbine cone 4 is fluidically optimized with respect to its function as the ejector 14. Referring by way of comparison to FIG. 1 as well as to FIG. 2, relative to the gondola 1 and to the engine jet 29 adjoining the gondola 1 (compare FIG. 1), the jet-type outlet opening 22 of the ejector 14, that is, the downstream end section of the low-pressure turbine cone 4, is situated in the interior of this engine jet 29, is arranged coaxially thereto and, viewed in the longitudinal direction of the aircraft engine, comes to be situated approximately in the center between the outlet plane of the mixer 8 and the section through the axes of the extended flaps of the thrust reverser, which are components of the engine jet 29. In FIG. 1, this section through the axes of the extended flaps of the thrust reverser is symbolized by the two dash-dotted lines having the reference number 30.

However, this as well as a plurality of other details, particularly of a constructive nature, can definitely have a design which deviates from the illustrated embodiment without departing from the invention as defined by the claims.

What is claimed is:

1. Turbofan aircraft engine comprising:
   a core engine which is arranged in a gondola,
   a fan which delivers a cold air current through a bypass flow duct,
   a mixer to which said cold air current is delivered by said fan, within which a low-pressure turbine cone is provided, and on which the hot-gas current emerging from a low-pressure turbine of the core engine is mixed with the cold-air current, a portion of the cold-air current being branched off by an ejector effect and, as a cooling air current for the low pressure turbine housing, arriving in a ring gap between the housing and a covering surrounding the housing,
   a follower guide wheel of the low-pressure turbine for sealing off a rearmost ring gap between the rotor and the stator of the low-pressure turbine,
   hollow outlet guide blades of said follower guide wheel by which a portion of the cooling air current is guided while the largest portion of the cooling air current reaches the ejector, wherein the largest portion of the cooling air current arrives through the hollow outlet guide blades in the interior of the low-pressure turbine cone which has a jet-type outlet opening at its downstream free end section, and wherein said downstream free end section acts as an ejector by way of which the cooling air current is admixed to the air current coming from the mixer.

2. Turbofan aircraft engine according to claim 1, wherein, on its upstream end section, on a circumference side, the low-pressure turbine cone has air transfer openings for the cooling air current flowing into the interior of the low-pressure turbine cone.

3. Turbofan aircraft engine according to claim 1, wherein the ring gap between the low-pressure turbine housing and the covering surrounding it is at least partially sealed off at its downstream end.

4. Turbofan aircraft engine according to claim 1, wherein the ejector is situated coaxially inside an aircraft nozzle approximately between an outlet plane of the mixer and a section through axes of extended flaps of a thrust reverser.

5. Turbofan aircraft engine according to claim 2, wherein the ring gap between the low-pressure turbine housing and the covering surrounding it is at least partially sealed off at its downstream end.

6. Turbofan aircraft engine according to claim 5, wherein the ejector is situated coaxially inside an aircraft nozzle approximately between an outlet plane of the mixer and a section through axes of extended flaps of a thrust reverser.

7. Turbofan aircraft engine according to claim 3, wherein the ejector is situated coaxially inside an aircraft nozzle approximately between an outlet plane of the mixer and a section through axes of extended flaps of a thrust reverser.

8. Turbofan aircraft engine according to claim 2, wherein the ejector is situated coaxially inside an aircraft nozzle approximately between an outlet plane of the mixer and a section through axes of extended flaps of a thrust reverser.

* * * * *